May 13, 1930.  J. E. THORNTON  1,758,769
MULTICOLOR CINEMATOGRAPH AND OTHER FILM
Original Filed May 5, 1924  2 Sheets-Sheet 1
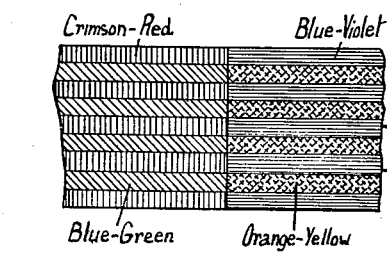
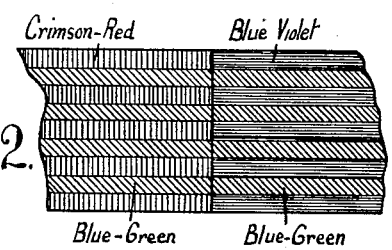
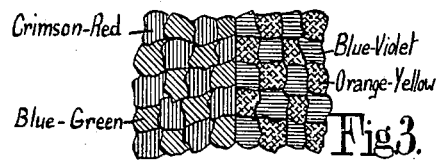
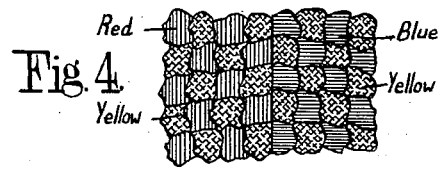
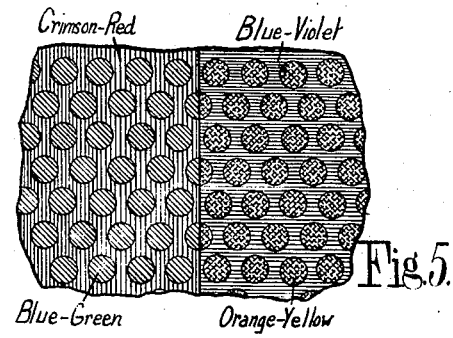
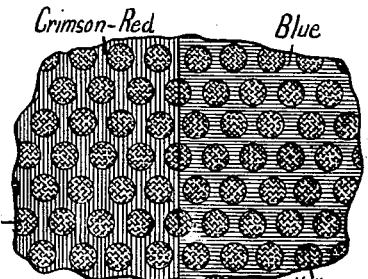
INVENTOR.
John E. Thornton
By
Attorney

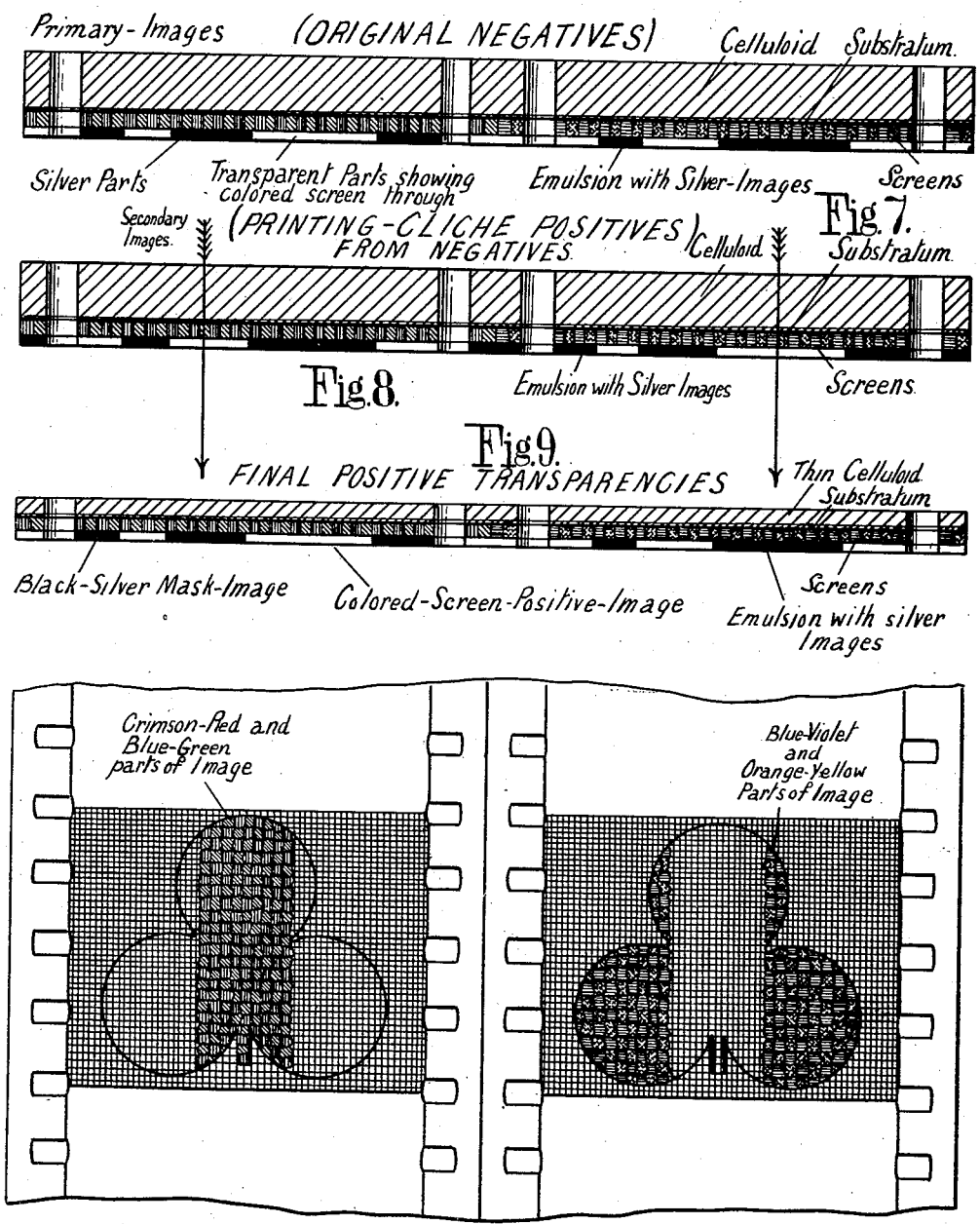

Patented May 13, 1930

1,758,769

UNITED STATES PATENT OFFICE

JOHN EDWARD THORNTON, OF WEST HAMPSTEAD, LONDON, ENGLAND

MULTICOLOR CINEMATOGRAPH AND OTHER FILM

Original application filed May 5, 1924, Serial No. 711,254, and in Great Britain May 18, 1923. Divided and this application filed November 3, 1925. Serial No. 66,602.

Applications for this invention were filed in Great Britain May 18, 1923, and Feb. 15, 1924.

This case is a division of Serial No. 711,254 filed May 5, 1924.

This invention provides a new system, method or process for the production of multi-color pictures comprising either four or three colors, in the form of continuous cinematograph films, or any other forms of transparencies, such as lantern-slides, window transparencies, advertisements, thin transfer tissues and the like, by entirely photographic methods.

The invention is designed to enable the completed pictures to be produced as double width transparencies comprising two half-pictures each of which contains only two colors, formed upon two films or plates, of the multi-color screen type, these two half-pictures being produced by means of two original negatives also in the form of two half-pictures of screen-type and two intermediate printing-clichés also consisting of two half-pictures of screen-type.

This result is attained by the use in combination of several factors, including:—the special method of producing the negatives, which consists in the use in combination of the following elements (1) a camera, one lens, and a light-splitting device which will divide the image formed by the lens into two images of identical size; (2) a special form of sensitive material of double-picture-area to receive these two images, the sensitized material having a pair of adjacent color-screens or filters (each comprising two colors, the colors of one screen being different from the colors of the other screen), the lens and light-splitting device dividing the original image into two and the color-screens of the sensitized material making a further division by which the analysis of four or three colors are recorded upon the one sensitive material of double-picture-area; and (3) by producing a further record or printing cliché, in which the primary images of the original negatives are converted into positive images of the printing-cliché either by chemical reversal or by copying.

Reconstruction of the split image and its colors is effected by a double-area positive print, made from the double-area printing-cliché upon a sensitized material of similar type and also double-area whereon two adjacent positives or half-pictures are formed, each comprising two colors, and each with a different pair of colors from the other.

*Comparison with previous color systems*

Several methods of producing cinematograph pictures in two colors are known and many attempts have been made to increase the range of colors to three, but in the latter case the technical difficulties are very great, and it has not been possible hitherto to produce commercial results with four colors.

By the present invention a simple and straight-forward method or process is presented by which multi-color photographs can be readily produced. Moreover, the invention is equally applicable to the production of such multi-color pictures upon glass plates, stiff films, thin rollable films, extremely thin transfer tissues, and continuous cinematograph films.

The basis of the invention consists in dividing the picture during the process of its production into two component parts each part having a different color-screen or filter, by doubling the area of the sensitive material, both for the negatives and positives, so that the two screens are formed in two picture-areas and thus four colors are filtered.

Therefore the improved results attained by this invention are accomplished:—(1) partly by use of the double-area sensitive material comprising two screens of two colors and (2) partly by use of the optical system which enables two images of identical size and standpoint to be formed upon the double-area sensitive-material; and by these joint means to secure four color analysis within the space of two picture areas.

Incidentally the same methods are used to produce three-color pictures if they are desired, by using film-material with its two screens modified in their colorings as hereinafter described.

To the photographer, this invention presents no new points to be overcome, and only requires the substitution of a double-area camera to take the double-area screen film material of the special construction hereinafter described, and provided with the light-splitting device, to enable four-color pictures to be photographed as easily as one-color pictures.

To the printer the invention makes the producing of a four-color positive as easy as printing an ordinary black-and-white positive, as the printing processes are the same but double-area sensitive material of the special construction hereinafter described is used instead of ordinary sensitive material.

In the drawings:—

Fig. 1 is a plan view of a portion of a double width strip of transparent support upon which are formed two screen filters, each of such filters comprising two colors formed of interspersed fine lines of different colors.

Fig. 2 is a view similar to Fig. 1 but with screens which will analyze only three colors.

Fig. 3 is a view similar to Fig. 1 wherein the screens are shown as formed of grains.

Fig. 4 is a view similar to Fig. 2 wherein the screens are shown as formed of grains.

Fig. 5 is a view similar to Fig. 1 wherein certain of the screen elements are shown as formed of dots.

Fig. 6 is a view similar to Fig. 2 wherein certain of the screen elements are shown as formed of dots.

Fig. 7 is a transverse section of a double width screen film negative material comprising a thick celluloid support, a substratum layer, and a pair of two-color filters, and bearing a pair of black silver primary images of negative character.

Fig. 8 is a transverse section of a double width screen film positive material bearing a pair of secondary images.

Fig. 9 is a transverse section of a double width screen film positive material comprising a celluloid support, a substratum layer, and a pair of two-color filters, and bearing a pair of black silver images of negative character which serve to block out all the parts of the screens not required as parts of the images.

Fig. 10 is a plan view of a piece of double width film bearing a conventional design.

In all the above drawings the lines and dots are shown very coarse and wide apart for clearness of illustration, but in practice are exceedingly fine, the lines being preferably about 500 to the inch and grains finer still.

*The invention applied to cinematography*

As the operations are the same for small non-cinematograph pictures and for cinematograph pictures upon continuous lengths of film, and as the invention will doubtless be used to a much greater extent for the latter form of pictures, the following description and details are written as applying to the production of cinematograph original negatives, printing-clichés and positives, all made upon continuous film-strips of double-picture-width.

*Structure of the negative material*

The following is a brief and general description of the negative film-material, a more detailed description of the material and method of its manufacture being given in the pending application Serial No. 711,254, filed May 5, 1924.

The special film-material upon which the negatives are photographed is of the class known as "screen film". By this is meant that the transparent celluloid base is provided with two color-filters (Figures 1 to 6) in the form of very fine multi-colored screens printed or formed upon a substratum amalgamated upon the face of the celluloid (or alternatively they may be printed direct upon the celluloid itself), and these screens are afterwards covered with a high-speed panchromatic gelatino-silver-bromide emulsion.

The base used for the negative film (Fig. 7) is preferably of the full standard thickness (about .0045 inch), and when the substratum, screen, and sensitized layers are added the total thickness of the negative film is about .0065 inch.

Exposure of this negative film in the camera is made with the transparent base of celluloid or other material facing towards the lens and the sensitized side turned away from the lens, so that light passes first through the transparent base (Figure 7), then through the multi-color light-filter, and finally reaches the panchromatic emulsion, upon which it forms a pair of section-images, each image representing two different color-sensations according to the color of the light which the filter has allowed to pass, and the two images representing four or three such color-sensations.

*For four-color negatives*

The filter-screen for four-color consists of an immense number of exceedingly fine colored dots, lines or mosaic pattern (Figs. 1, 3 and 5). These are arranged in two groups, side-by-side upon the two halves of the double-widths film strip. One section consists of dots (Figure 5), lines (Figure 1) or mosaic pattern (Figure 3) of two colors equally intermixed, and the other section of two other colors equally intermixed. The colors used for a four-color screen-filter set are preferably crimson-red and blue-green for one half of the double-width negative film, and blue violet and orange-yellow for the other half. These form one filter set containing the complementary colors of red and green, and another filter-set containing the complementary colors of blue and yellow.

Each half of the double-width film therefore contains its own complementary color, and the two halves are also complementary to each other.

For three-color negatives

The filter-screen for three-color is of a similar character consisting of fine dots, lines, or mosaic pattern, but the colors comprise only crimson-red, blue-green, and blue-violet (Figure 2) and are therefore only semi-complementary. They are arranged in two groups, one upon each half of the double-width film as in the preceding example, but one of the colors is repeated upon each half. For example one half-width may have a filter-screen of red and green, and the other a filter-screen of blue-violet and green. Or any other preferred arrangements of the combination may be used; for instance by duplicating the yellow filters on the negative the complementary color, blue-green, will predominate in the positive because it will be duplicated upon both halves (Figures 4 and 6).

Producing the original (camera) negatives

The sources of many of the difficulties which occur in the later stages of making the print itself in some other systems of color cinematography are found at the very commencement of operations, viz:—at the camera and optical section, and in the present invention I therefore seek to simplify all the later steps by simplification of the optical difficulties, as will be seen by the following statements:—

In some methods for obtaining four-color results it is necessary to have four section-negatives, each representative of a different color sensation; and for three-color results three section-negatives are necessary.

To secure perfect results all section-negatives must be made by simultaneous exposures at the same moment, in order to secure in each the same identical phase of the subject-movement for each section-picture. They must therefore all be exposed by means of only one lens in order to secure the same view point.

Photographing each section-picture one after the other in alternating arrangement, as proposed in some systems, shows image-movement between the section-negatives of every picture, and this is again reproduced in the positive picture, resulting when the picture is projected on the screen in the serious image-displacement technically known as "fringing". Photographing the sections simultaneously by means of two or more adjacent lenses, as proposed in some systems, produces the alternative objection of image-displacement due to "parallax".

It has therefore been sought by many investigators to cure all these faults by photographing through one lens, and then splitting the light of the primary image so that it forms two or more section-images by means of prisms, mirrors, partial reflectors, grids, or the like. These methods are all more or less feasible or satisfactory for producing two-color pictures, as the primary image has to be only once split to form two section-images; but when the primary has to be divided into three in order to produce three section-images the optical difficulties are greatly increased; and the cost, bulk, and complexity of the optical devices are very much increased; but when the primary image is required to be still further split to form four section-images all these difficulties are enormously increased. By each step of splitting more of the effective light is lost, thus tremendously increasing the liability of under-exposure.

There are also other (mechanical) difficulties introduced in moving the film through the camera, for a four-section picture taken on ordinary film with its section-pictures side by side would require a film of quadruple width, or two films of double-width, or four films of single-width; or alternatively if the section-pictures were taken on ordinary films of single width two films with a double-tier of two pictures upon each would be required, or a single film with a quad-tier of four pictures. If only a three-color picture is desired objections of a similar nature arise.

To produce either four or three color-section negatives splitting the light is preferable to the image-displacement which results from two successive exposure movements.

By the present invention all these several objections are overcome and it becomes almost as simple to produce cinematograph pictures of four colors as it was formerly to produce pictures of only two colors. The four-color analysis in the negative is secured by using a particular combination, as follows:—

Combination for producing four-color negatives. At one camera-exposure

The necessary elements of this combination comprise the following:—

(1) A double-width strip of negative film; with a two-color filter-screen of dot, line or mosaic pattern (Figures 1, 3 and 5) in colors such as crimson-red and blue-green, formed upon one half of the double film, and another similar two-color filter-screen such as blue-violet and orange-yellow, formed upon the other half of the double film; the celluloid side of the film being turned towards the lens, and the light passing through the two screens on to the panchromatic sensitive layer placed furthest from the lens (Figure 7);

(2) One exposure-lens; and (3) One light-splitting prism, mirror, or equivalent optical device, dividing the original image into two and passing the resulting two image-beams through the two filter-screens of the two film-sections, and forming at the focal plane two images of identical size.

By this means four negative section-images in the form of two half-pictures are formed by one lens, from one view point, at one instant, by one exposure, upon one double-picture-area of one negative-film strip.

Producing the printing-clichés

Having made the camera exposure and obtained the original negative-records by the method described, it is now necessary to produce a printing-cliché from which the final positive-records for exhibition can be printed. At this stage therefore either of the following alternative courses are open:—

(A) The original (camera) negative (which is complementary in its coloring to the actual scene photographed) may be used to produce a corrected positive by printing from the original negative through a lens on to a positive film of similar character, also provided with similar color filters and panchromatic emulsion, in which case the colors on the resulting positive will be again reversed and therefore will be the same as those in the original scene or object (Figure 8).

(B) The original (camera) negative may be treated by the usual reversal baths and treatment by which it can be converted from a negative of incorrect or complementary colors into a positive of correct or non-complementary colors, so that the real coloring of the scene or object is produced on the original film.

(C) A positive in black and white can be reproduced from the colored negative A, or a negative in black and white can be reproduced from the colored positive B, by copying through a lens and camera.

Preferred form of printing-clichés

Of these several methods it is preferred in commercial manufacture not to use the original (camera) negative, because of the labor involved in treating continuous lengths of film to the processes of reversal, and also because of the danger of damaging the original negative in the processes.

It is therefore preferred to make a reproduction from the original (Figure 8), and further because by making such reproduction the necessary reversal of image is simultaneously effected. Therefore a positive print is made from the original negative by copying in a camera through a lens and developing the image in the usual way, in accordance with method A. This will produce a copy in which the black-silver images will be of positive character, and this copy is used as the printing-cliché from which the actual exhibition positives (Figure 9) are reproduced.

Therefore in their final reproductions for exhibition purposes (produced according to the co-pending application Serial No. 711,254 hereinbefore referred to) the black-silver images will be of negative character and the color-screens visible through them will be of positive character.

Producing the color positives

Having described the methods of producing the original negatives which constitute the primary images, and the printing-clichés which constitute the secondary images, it now only remains to describe the production of the final positives for exhibition, or third images.

Film-material for color-positives

Ordinary non-cinematograph positives of various sizes are produced upon double-area sensitive material of any size and with a transparent base of any suitable material, for example, glass-plates for lantern-slides; stiff-celluloid sheets for window transparencies, stereoscopes, and the like; thin rollable films for use in many decorative purposes; and extremely tenuous celluloid tissue for transfers to wood, paper, or other materials.

But for cinematograph positives the film-material is made of double standard width (Fig. 9).

Otherwise the positive film-material is similar to that used for the original negatives and intermediate printing-clichés; but the speed of the sensitive emulsion may be slower and its grain therefore finer.

Printing the color positives

In the present process each pair of differential positive images is printed in one layer of non-colored sensitive silver-emulsion, behind a screen of colored lines, dots, or other pattern which are visible by transmitted light only to the extent allowed by the silver image, which forms a mask or cut-out for portions of the coloring and allows the remainder to pass through and constitute the positive picture (Figure 11).

The positive process used in this invention is therefore quite different from the processes heretofore used. In the present invention all the images are of black-silver in the form of black and white transparencies, superimposed upon colored screens which cover the whole of the base of the film or plate.

What I claim as my invention and desire of the base of the film or plate.

1. A method of producing a photograph in the form of a multi-color transparency which consists in photographically splitting the original scene or picture into two component half-pictures in two mosaic-colorscreen images of negative character upon a transparent sensitized support of double-picture-area, each half-picture image representing a different pair of colors from the other, and photographically reproducing from the half-pictures of negative character a further two half-pictures, but of positive character, upon another transparent support also of double-picture-area having a sensitized panchromatic emulsion layer attached to the support and two mosaic-color-screens formed side-by-side upon the support between it and the emulsion thereon, one screen representing and filtering one pair of colors and the other screen a different pair of colors.

2. A method of producing a photograph in the form of a multi-color transparency which consists in photographically splitting the original scene or picture into two component half-pictures in two mosaic-color-screen images of negative character upon a transparent sensitized support of double-picture-area, each half-picture image representing a different pair of colors from the other, by photographically producing two images of identical size and negative character upon the one sensitized support of double-area and by passing the light rays of such images through a pair of mosaic-color-screens formed between the double-area support and a sensitive panchromatic emulsion layer attached to the support, one screen representing and filtering one pair of colors and the other screen a different pair of colors, thus producing four analyses of color within two picture areas upon the one support of double area, photographically reproducing from these two half-pictures two intermediate half-pictures in the form of printing-clichés, also of negative character, upon the double-area transparent sensitive screen-film-material, photographically reproducing from the two printing-clichés of negative character a further two half-pictures, but of positive character, also upon a transparent support of double-picture-area, and by printing from the printing-clichés on to the sensitized positive support, such double-area support having a sensitized panchromatic emulsion layer attached to the support and two mosaic-color-screens formed side-by-side upon the support between emulsion and support, one screen representing and filtering one pair of colors and the other screen a different pair of colors.

3. A method of producing a multi-colored transparent photograph which comprises producing a pair of primary images of negative character upon a sensitive mosaic-color-screen film-material of double-width with two screens side-by-side each containing two colors, one pair of colors being different from the other pair, producing therefrom a pair of intermediate printing-cliché secondary images also of negative character, upon similar sensitive mosaic-color-screen film-material, and finally producing by projection from the intermediate printing-clichés a pair of final images of positive character upon similar sensitive mosaic-color-screen film-material of double-area and having two screens side-by-side, a different pair of colors being represented in each positive image.

4. The method of multi-color photography as described in claim 2, wherein the pair of color screen negatives, the pair of intermediate printing-clichés, and the pair of color screen positives are each formed side-by-side upon supports of double width and double-area.

5. The method of producing a multi-color transparency which consists in photographing through a single lens and prism, splitting the picture into two parts on to a sensitive panchromatic screen film to form two half-picture negatives, and printing from such negatives on to a sensitive panchromatic screen film to produce two half-picture positives of two colors each.

In testimony whereof I have hereunto set my hand.

JOHN EDWARD THORNTON.